INVENTORS
H. S. Morrison
P. F. Hilder

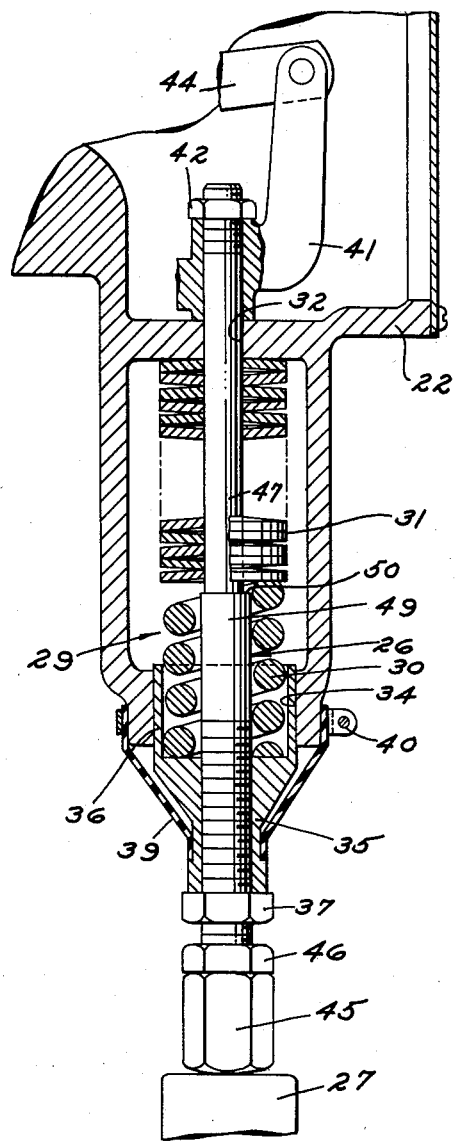

3,156,303
TRACTOR DRAFT CONTROL SPRING
Peter F. Hilder, Birmingham, and William S. Morrison, Royal Oak, Mich., assignors to Ford Motor Company, Dearborn, Mich., a corporation of Delaware
Filed Dec. 22, 1961, Ser. No. 161,603
1 Claim. (Cl. 172—7)

This invention relates to tractor draft control devices.

In tractors having a power liftable hitch for controlling the height of an implement positioned behind the tractor, the height of the hitch often is controlled responsive to draft on the implement to maintain a more or less uniform draft which can be selected by the operator. The implement will be raised or lowered automatically as required to maintain the predetermined draft. When using a plow or subsoiler, the draft is relatively high, and when using row crop cultivators and planters, the draft is much lower.

For sensing the draft of an implement, it is usual to provide a draft sensing plunger on the rear of the tractor which is displaced varying amounts responsive to the degree of draft. Displacement of the draft sensing plunger is resistor by a draft control spring extending between the plunger and a portion of the housing within which the plunger is mounted. Essentially, the plunger is displaced by a force generally proportional to the draft, and this force acting on the plunger is balanced by the partially compressed draft control spring. The predetermined draft for which the hitch will be neither raised nor lowered (neutral point of the plunger) may be set by the operator. A lesser draft will cause the hitch to be lowered and an increased draft will cause the hitch to be raised.

Raising or lowering of the hitch usually is accomplished by a hydraulic cylinder, the control valve for which is mechanically actuated by a draft sensing plunger. In larger, more powerful tractors, the draft capability of the tractor requires use of a relatively stiff draft control spring to prevent bottoming of the spring and loss of draft control. However, if the same spring is utilized with light draft implements, the sensitivity or response to change in draft will be much less, inasmuch as the deflection of such a spring and movement of the plunger for a given percentage of change of draft is relatively slight.

According to the present invention, a compound draft control spring is used which provides greater deflection per unit increase of load in the lower range of draft and lesser deflection in the upper range, thus facilitating accurate draft control throughout the entire range of draft of which the tractor is capable. In some respects, the present invention is an improvement over that disclosed in Edman U.S. Patent 2,900,030.

In the form shown of the present invention, a low-rate coil spring and a high-rate spring are arranged to act in series, both being deflected by the draft sensing plunger in its initial range of movement for sensing lighter drafts. The combined rate of the two springs is somewhat less than for the lighter spring alone. In this range of movement of the plunger, the force is within the capacity of the lower rate spring. At the end of its initial range of movement, the draft sensing plunger engages the higher rate spring and further movement of the plunger is opposed by the higher rate spring alone, the lower rate spring not being further compressed.

Among the objects of the present invention are to provide a tractor draft control that has a high capacity and at the same time has good sensitivity in the lower draft range, to provide such a control that has a smooth transition between low- and high-draft ranges, that is compact and dependable in operation, and generally to improve tractor draft control devices of the type described.

Other objects and objects relating to details and economies of construction will be apparent from the detailed description to follow.

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification, in which:

FIGURE 2 is an enlarged vertical section of the draft sensing plunger and associated parts, taken generally through the axis of the plunger.

Figure 1:
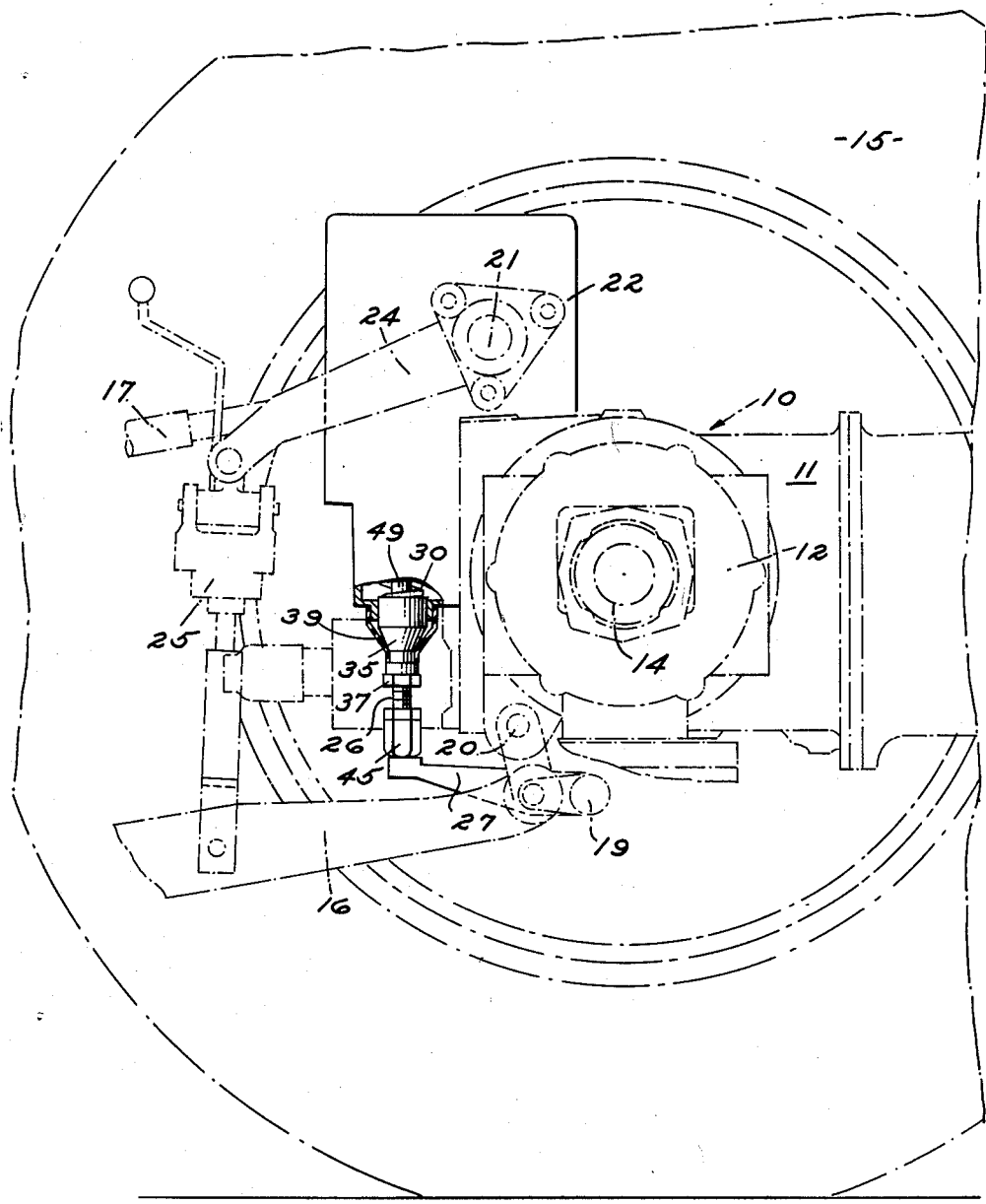
FIGURE 1 is a side elevation of the rear portion of a tractor, one of the wheels being removed and portions of the tractor being broken away or shown in section for convenience of illustration.

Referring now to FIGURE 1, the tractor of the present invention has a rear axle assembly 10 including a center housing 11 and right and left axle housings, only the right axle housing 12 being shown. Axle shafts are received within the axle housings, one of the axle shafts 14 being shown. The rear wheels of the tractor are supported from the axle shafts, one wheel 15 being shown.

The tractor hitch is of the well-known "three-point hitch" type, including a pair of laterally spaced lower draft links, the right link 16 being shown, and a centrally located top link 17.

The forward ends of the draft links are attached to the rear axle assembly 10 by means of a rocker 19 which is pivotally supported on the housing by pins 20, one pin being shown. The rocker 19 transmits at least most of the draft or pull of the tractor to an implement attached to the hitch. The top link 17 may be either in compression or in tension, depending upon whether the implement is under heavy draft, light draft, or in transport. For coupling certain trailed implements to the tractor, the top link 17 is not used.

The tractor includes a power lift mechanism for the hitch, comprising a transversely extending rock shaft 21 journaled within a lift housing 22 mounted on the center housing 11. A pair of lift arms are fixed to the projecting ends of the rock shaft 21, one lift arm 24 being shown. The lift arms project rearwardly and are connected to an intermediate point on the draft links by means of lift links, one lift link 25 being shown. The arrangement is such that clockwise rotation of the rock shaft 21, as viewed in FIGURE 1, raises the lift arms and lift links so as to raise the draft links and thus raise the implement. Conversely, counterclockwise rotation of the rock shaft 21 lowers the draft links and the implement. This hitch and associated parts are shown and described in greater detail in Richey et al. U.S. patent application 76,242, filed December 16, 1960, now Patent No. 3,098,528 issued July 23, 1963.

The tractor includes a hydraulic system (not shown) for raising or lowering the hitch by admitting hydraulic fluid to or releasing it from a hydraulic cylinder mounted within the lift housing 22 and acting to rotate the lift shaft 21. After manual setting, operation of the hydraulic system is controlled automatically by a draft sensing plunger 26 mounted for axial movement within a wall of the center housing 11 and, through suitable linkage, operating a valve which controls admission and release of fluid from the cylinder. The draft sensing plunger 26 is engaged and operated by a draft reaction arm 27 which may be formed as an integral part of the rocker 19. A draft control spring 29 biases the draft sensing plunger outwardly of the housing (downwardly as indicated in the drawings).

Tension on the draft links of the tractor caused by resistance to passage of an implement, e.g., a plow, through the ground, tends to rotate the rocker 19 about its mounting pins 20 on the tractor, so as to rotate the draft reaction arm 27 clockwise about the pins 20 and force the draft sensing plunger 26 upwardly, thereby more or less compressing the draft control spring 29. The force communicated to the draft sensing plunger is generally proportional to the tension in the draft links, and to the total draft on the tractor caused by the implement.

The operator, by means of a quadrant lever (not shown), can adjust the control system to maintain any predetermined draft on the tractor. In essence, this mechanism adjusts the linkage between the draft sensing plunger 26 and a valve controlling admission of fluid to the hydraulic system so that if the draft control spring 29 is compressed less than a predetermined amount, the hitch will be lowered and if the spring is compressed more than a predetermined amount, the hitch will be raised. A tractor hydraulic system of this general type is shown in Ferguson U.S. Patent 2,356,231. In this fashion, the implement is almost constantly being raised or lowered small amounts, as required, to maintain a constant draft on the tractor.

Draft characteristics of implements vary over a large range. Plows and subsoilers often operate under very heavy draft, which may be about the maximum draft of which the tractor is capable. On the other hand, implements such as cultivators and planters may require only one-fifth of maximum draft. For larger sizes of tractors, the usual constant-rate draft control spring must be a very high-rate spring (very stiff) in order to avoid bottoming and loss of its draft control function under maximum draft conditions which may be encountered with the use of plows and subsoilers. However, such a spring lacks the desired sensitivity when used with light-draft implements in that the change in draft necessary to cause a correction in height of the implement must be too large a percentage of the total draft on the implement. This occurs due to the fact that the deflection per unit load of the stiff spring is quite small.

According to the present invention, the draft control spring 29 is a compound spring which is formed of a low-rate spring 30 and a high-rate spring 31 in series. Initial movement of the draft sensing plunger 26 is resisted by the springs 30 and 31 acting in series during an initial range of movement of the plunger and resisted solely by the high-rate spring 31 during a further range of movement of the plunger.

Referring now to FIGURE 2 for a detailed showing of the invention, the draft sensing plunger 26 is mounted for axial movement in the wall of the lift housing 22. The mounting of the plunger in the housing preferably consists of a pair of coaxial bores 32 and 34 in the housing to receive the plunger. Preferably, the bore 34 in the housing is enlarged to receive the draft spring seat 35 which is threadedly engaged with the draft sensing plunger. The spring seat 35 has a cylindrical surface 36 forming an enlarged bearing within the bore 34. A lock nut 37 threadedly engaged with the draft sensing plunger 26 serves to lock the spring seat 35 in adjusted position. Preferably, a flexible rubber dust boot 39 surrounds the spring seat and is clamped to the lift housing 22 by a band 40 to protect the joint against entrance of foreign matter.

A draft sensing plunger extension 41 is threadedly engaged with the upper end of the plunger and is held in adjusted position by a lock nut 42. The extension 41 is pivotally connected to a lever 44 which is connected to a linkage (not shown) for operating the valve previously referred to for controlling admission of fluid to the hydraulic cylinder of the lift.

The compound spring 29 extends between the spring seat 35 of the draft sensing plunger and the lift housing 22 so as to bias the plunger outwardly (downwardly as shown in FIGURE 2). The engagement of the plunger extension 41 with the housing about the margin of the bore 32 serves as a stop to limit outward movement of the plunger. The lower end of the plunger is provided with a screw-threaded extension nut 45 and lock nut 46 for adjusting the over-all length of the plunger. The extension nut 45 is engaged by the draft reaction arm 27.

The low-rate spring 30 preferably is a constant-rate spring formed of a helix of spring wire, while the high-rate spring 31 preferably is formed of a stack of Belleville washers which are arranged facing in alternate directions to serve collectively as a spring. An axial force exerted on the high-rate spring 31 tends to flatten the washers and thereby provide for displacement of the spring and plunger.

The upper or inner portion 47 of the draft sensing plunger 26 is of somewhat smaller diameter than the lower of outer portion thereof to provide a radially extending step 50 a short distance from the outer end of the high-rate spring 31. The arrangement is such that upon a draft force being exerted on the plunger 26, it will be displaced upwardly and its upward movement will be resisted by both the low-rate spring 30 and the high-rate spring 31 acting in series. However, most of the deflection will take place in the low-rate spring 30. In its initial range of movement, the draft plunger will load both springs with equal force, and this range will continue until the radial step 50 engages the lower end of the high-rate spring 31. This range of movement of the plunger 26 is suited for sensing relatively low and intermediate degrees of draft.

After the draft plunger has been depressed sufficiently to engage the radial step 50 with the lower or outer end of the high-rate spring 31, further inward motion of the plunger is resisted solely by the high-rate spring, the low-rate spring 30 not being additionally compressed. This provides for very low displacement with increase of unit load, and is particularly suited for sensing heavy draft such as occurs in the use of plows and subsoilers. The high-rate spring 31 is capable of sustaining the thrust on the draft sensing plunger resulting from maximum draft of which the tractor is capable without the spring or plunger bottoming.

We claim:

In a tractor having a power liftable implement hitch and power means for lifting the hitch; a housing, a draft sensing plunger mounted for movement in a wall of the housing for controlling operation of the power means, means for impressing a force on the plunger generally proportional to draft of an implement connected to the hitch and tending to displace the plunger, and a compound spring formed of a low rate spring and a high rate spring coaxial with the plunger, the springs being arranged in end to end abutting relation and extending between the plunger and housing with the high rate spring extending between the low rate spring and the housing, the high rate spring being formed of a series of Belleville washers closely fitting about the plunger, and a radial step formed on the plunger of larger diameter than the portion fitting within the high rate spring and engaged with the end of the high rate spring upon movement of the plunger beyond its initial range of movement.

References Cited in the file of this patent

UNITED STATES PATENTS

| | | |
|---|---|---|
| 2,402,400 | Hewitt et al. | June 18, 1946 |
| 2,620,239 | Gruenais | Dec. 2, 1952 |
| 2,804,814 | Czarnocki | Sept. 3, 1957 |
| 2,900,030 | Edman | Aug. 18, 1959 |
| 3,039,758 | Gratzmuller | June 19, 1962 |

FOREIGN PATENTS

| | | |
|---|---|---|
| 1,133,819 | France | Nov. 26, 1956 |
| 1,206,153 | France | Aug. 24, 1959 |
| 1,024,740 | Germany | Feb. 20, 1958 |
| 872,964 | Great Britain | July 19, 1961 |